United States Patent
Hosseini et al.

(10) Patent No.: US 12,171,013 B2
(45) Date of Patent: Dec. 17, 2024

(54) PHYSICAL UPLINK CONTROL CHANNEL RESOURCE CONFIGURATION

(71) Applicant: QUALCOMM Incorporated, San Diego, CA (US)

(72) Inventors: Seyedkianoush Hosseini, San Diego, CA (US); Seyed Ali Akbar Fakoorian, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/863,674

(22) Filed: Apr. 30, 2020

(65) Prior Publication Data

US 2020/0351891 A1  Nov. 5, 2020

Related U.S. Application Data

(60) Provisional application No. 62/842,976, filed on May 3, 2019.

(51) Int. Cl.
*H04W 72/21* (2023.01)
*H04L 1/1812* (2023.01)
(Continued)

(52) U.S. Cl.
CPC .......... *H04W 72/53* (2023.01); *H04L 1/1819* (2013.01); *H04L 5/0055* (2013.01);
(Continued)

(58) Field of Classification Search
CPC ......... H04W 72/0446; H04W 72/0413; H04W 72/042; H04L 5/0055; H04L 5/0094
See application file for complete search history.

(56) References Cited

U.S. PATENT DOCUMENTS 10,616,869 B2    4/2020  Chen et al.
2019/0313342 A1*  10/2019  Papasakellariou .... H04W 52/54
(Continued)

FOREIGN PATENT DOCUMENTS

WO    2017139097 A1    8/2017
WO    2018022560 A1    2/2018

OTHER PUBLICATIONS

LG Electronics: "Remaining Issues on UL Data Transmission Procedure", 3GPP Draft, 3GPP TSG RAN WG1 Meeting 91, R1-1719932 Remaining Issues on UL Data Transmission Procedure, 3rd Generation Partnership Project (3GPP), Mobile Competence Centre, 650, Route Des Lucioles, F-06921 Sophia-Antipolis Cede, vol. RAN WG1. No. Reno. USA, Nov. 27, 2017-Dec. 1, 2017, Nov. 18, 2017 (Nov. 18, 2017), XP051369645, 15 Pages, Retrieved from the Internet: URL: http://www.3gpp.org/ftp/tsg%5Fran/WG1%5FRL1/TSGR1%5F91/Docs/ [retrieved on Nov. 18, 2017], paragraph [02.2].

(Continued)

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment (UE) may receive a physical uplink control channel (PUCCH) resource configuration including a plurality of sub-slot PUCCH resources for the UE. The UE may determine that a sub-slot PUCCH resource, of the plurality of sub-slot PUCCH resources, for use with an uplink transmission crosses a slot boundary. The UE may adjust the uplink transmission based at least in part on determining that the sub-slot PUCCH resource crosses the slot boundary. Numerous other aspects are provided.

26 Claims, 13 Drawing Sheets

(51) Int. Cl.
| | |
|---|---|
| *H04L 5/00* | (2006.01) |
| *H04W 72/0446* | (2023.01) |
| *H04W 72/23* | (2023.01) |
| *H04W 72/53* | (2023.01) |
| *H04W 76/27* | (2018.01) |

(52) U.S. Cl.
CPC ....... *H04W 72/0446* (2013.01); *H04W 72/21* (2023.01); *H04W 72/23* (2023.01); *H04W 76/27* (2018.02)

(56) References Cited

U.S. PATENT DOCUMENTS

| | | | | |
|---|---|---|---|---|
| 2019/0363843 | A1* | 11/2019 | Gordaychik | H04L 1/08 |
| 2020/0145143 | A1* | 5/2020 | Nemeth | H04L 1/1819 |
| 2020/0205150 | A1* | 6/2020 | Cheng | H04W 72/21 |
| 2021/0282137 | A1* | 9/2021 | Wang | H04L 1/1819 |

OTHER PUBLICATIONS

NTT Docomo Inc., "Summary of [87-32]: UL L1/L2 Control Channel Design for NR", R1-1700618, 3GPP TSG RAN WG1 AHH_NR Meeting, Spokane, USA, Jan. 16-20, 2017, Jan. 19, 2017 (Jan. 17, 2017), XP051208710, 30 Pages, http://www.3gpp.org/ftp/tsg_ran/WG1_RL1/TSGR1_AH/NR_AH_1701/Docs/ [retrieved on Jan. 17, 2017], paragraph [03.4].
Huawei et al., "Discussion on sTTI Structure", 3GPP Draft, 3GPP TSG RAN WG1 Meeting #86bis, R1-1608631 3rd Generation Partnership Project (3GPP), Mobilecompetence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 1, 2016 (Oct. 1, 2016), XP051158987, 4 Pages, Retrieved from the Internet: URL: http://www.3gpp.org/ftp/tsg_ran/WG1_RL1/TSGR1_86b/Docs/ [retrieved on Oct. 1, 2016], paragraph [02.2].
Intel Corporation: "Short UL Control Channel Early in a Slot", 3GPP Draft, 3GPP TSG RAN WG1 NR Ad-Hoc#2, R1-1710564 Short UL Control Channel Early in a Slot, 3rd Generation Partnership Project (3GPP), Mobile Competence Centre, 650, Route Des Lucioles, F-06921 Sophia-Antipolis Cedex, France, vol. RAN WG1. No. Qingdao, China, Jun. 27, 2017-Jun. 30, 2017, Jun. 17, 2017 (Jun. 17, 2017), XP051305135, pp. 1-4, Retrieved from the Internet: URL: http://www.3gpp.org/ftp/tsg_ran/WG1_RL1/TSGR1_AH/NR_AH_1706/Docs/ [retrieved on Jun. 17, 2017], figures 2-3.
International Search Report and Written Opinion—PCT/US2020/030965—ISA/EPO—Nov. 19, 2020.
LG Electronics: "Remaining Issues on UL Data Transmission Procedure", 3GPP Draft, 3GPP TSG RAN WG1 Meeting 91, R1-1719932 Remaining Issues on UL Data Transmission Procedure, 3rd Generation Partnership Project (3GPP), Mobile Competence Centre, 650, Route Des Lucioles, F-06921 Sophia-Antipolis Cede, vol. RAN WG1. No. Reno. USA, Nov. 27, 2017-Dec. 1, 2017, Nov. 18, 2017 (Nov. 18, 2017), XP051369645, 15 Pages, Retrieved from the Internet: URL: http://www.3gpp.org/ftp/tsg%5Fran/WG1%5FRL1/TSGR1%5F91/Docs/ [retrieved on 2017-11-18], paragraph [02.2].
Mediatek Inc: "Enhancements of UCI for URLLC", 3GPP Draft, 3GPP TSG RAN WG1 Ad-Hoc Meeting 1901, R1-1900209 Enhancements of UCI for URLLC, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593132, 10 Pages, Retrieved from the Internet: URL: http://www.3gpp.org/ftp/Meetings%5F3GPP%5FSYNC/RAN1/Docs/R1%2D1900209%2Ezip, [retrieved on Jan. 20, 2019], paragraph [03.1].
Nokia et al., "On UCI Enhancements for NR URLLC", 3GPP Draft, 3GPP TSG RAN WG1 #96bis, R1-1904828_NOKIA_EURLLC UCI ENH, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 3, 2019 (Apr. 3, 2019), XP051707327, 11 Pages, Retrieved from the Internet: URL: http://www.3gpp.org/ftp/tsg%5Fran/WG1%5FRL1/TSGR1%5F96b/Docs/R1%2D1904828%2Ezip [retrieved on Apr. 3, 2019], paragraph [02.1].
Nokia et al., "On UCI Enhancements for URLLC," 3GPP Draft, 3GPP TSG RAN WG1 Ah Hoc Meeting 1901, R1-1900928 EURLLC UCI ENH, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593772, 13 Pages, Retrieved from the Internet: URL: http://www.3gpp.org/ftp/Meetings%5F3GPP%5FSYNC/RAN1/Docs/R1%2D1900928%2Ezip [retrieved on Jan. 20, 2019] paragraph [02.1].
NTT Docomo et al., "PUSCH Enhancements for URLLC", 3GPP Draft, 3GPP TSG RAN WG1 #96, R1-1902806 PUSCH Enhancements for URLLC, 3rd Generation Partnership Project (3GPP), Mobile Competence Centre, 650, Route Des Lucioles, F-06921 Sophia-Antipolis Cedex, France, vol. RAN WG1, No. Athens. Greece Feb. 25, 2019-Mar. 1, 2019, Feb. 16, 2019 (Feb. 16, 2019), XP051600501, pp. 1-7, Retrieved from the Internet: URL: http://www.3gpp.org/ftp/tsg%5Fran/WG1%5FRL1/TSGR1%5F96/Docs/R1%2D1902806%2Ezip [retrieved on Feb. 16, 2019], paragraph [02.1].
NTT Docomo et al., "Summary for Rel-15 UL Configured Grant Transmission", 3GPP Draft, 3GPP TSG RAN WG1 Meeting #96bis, R1-1905692 3rd Generation Partnership Project (3GPP), Mobile Competence Centre, 650, Route Des Lucioles, F-06921 Sophia-Antipolis Cedex, France, vol. RAN WG1, vol. Xi 'an. China, Apr. 8, 2019-Apr. 12, 2019, Apr. 9, 2019 (Apr. 9, 2019), XP051707751, 10 Pages, Retrieved from the Internet: URL: http://www.3gpp.org/ftp/tsg%5Fran/WG1%5FRL1/TSGR1%5F96b/Docs/R1%2D1905692%2Ezip [retrieved on Apr. 9, 2019], p. 1-p. 3.
NTT Docomo et al., "WI Summary of New Radio Access Technology", 3GPP Draft, 3GPP TSG-RAN Meeting #80, RP-181466 WI Summary, 3rd Generation Partnership Project (3GPP), Mobile Competence Centre, 650, Route Des Lucioles, F-06921 Sophia-Antipolis Cedex, France, vol. TSG RAN, No. La Jolla, US, Jun. 11, 2018-Jun. 14, 2018, Mar. 24, 2019 (Mar. 24, 2019), 13 Pages, XP051689881, Retrieved from the Internet: URL: https://www.3gpp.org/ftp/tsg_ran/TSG_RAN/TSGR_80/Docs/RP-181466.zip [retrieved on Mar. 24, 2019], p. 6-p. 7.
NTT Docomo Inc., "Summary of [87-32]: UL L1/L2 Control Channel Design for NR", R1-1700618, 3GPP TSG RAN WG1 AH_NR Meeting, Spokane, USA, Jan. 16-20, 2017, Jan. 19, 2017 (Jan. 17, 2017), XP051208710, 30 Pages, http://www.3gpp.org/ftp/tsg_ran/WG1_RL1/TSGR1_AH/NR_AH_1701/Docs/ [retrieved on Jan. 17, 2017], paragraph [03.4].
Panasonic: On NR URLLC Enhancements for Grant-Free Transmission, 3GPP draft, 3GPP TSG RAN WG1 Meeting #95, R1-1812797, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 2, 2018 (Nov. 2, 2018), XP051479042, 5 Pages, Retrieved from the Internet: URL: http://www.3gpp.org/ftp/tsg%5Fran/WG1%5FRL1/TSGR1%5F95/Docs/R1%2D1812797%2Ezip [retrieved on Nov. 2, 2018], p. 2-p. 3.
Partial International Search Report—PCTUS2020030965—ISAEPO—Sep. 15, 2020.

* cited by examiner

PHYSICAL UPLINK CONTROL CHANNEL RESOURCE CONFIGURATION

CROSS-REFERENCE TO RELATED APPLICATION

This Patent Application claims priority to U.S. Provisional Patent Application No. 62/842,976, filed on May 3, 2019, entitled "PHYSICAL UPLINK CONTROL CHANNEL RESOURCE CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink control channel (PUCCH) resource configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a physical uplink control channel (PUCCH) resource configuration including a plurality of sub-slot PUCCH resources for the UE; determining that a sub-slot PUCCH resource, of the plurality of sub-slot PUCCH resources, for use with an uplink transmission crosses a slot boundary; and adjusting the uplink transmission based at least in part on determining that the sub-slot PUCCH resource crosses the slot boundary.

In some aspects, a method of wireless communication, performed by a UE, may include receiving one or more configuration messages identifying a plurality of sub-slot PUCCH resources and an indication of a particular sub-slot PUCCH resource, of the plurality of sub-slot PUCCH resources, to be used for PUCCH repetition; determining, based at least in part on the one or more configuration messages, a quantity of PUCCH repetitions for transmission in the plurality of sub-slot PUCCH resources; determining, based at least in part on a scheduling of the quantity of PUCCH repetitions and one or more other transmissions, whether to modify the particular sub-slot PUCCH resource; and selectively transmitting uplink control information (UCI) based at least in part on a result of determining whether to modify the particular sub-slot PUCCH resource.

In some aspects, a UE for wireless communication may include memory and one or more processors coupled to the memory. The memory and the one or more processors may be configured to receive a PUCCH resource configuration including a plurality of sub-slot PUCCH resources for the UE; determine that a sub-slot PUCCH resource, of the plurality of sub-slot PUCCH resources, for use with an uplink transmission crosses a slot boundary; and adjust the uplink transmission based at least in part on determining that the sub-slot PUCCH resource crosses the slot boundary.

In some aspects, a UE for wireless communication may include memory and one or more processors coupled to the memory. The memory and the one or more processors may be configured to receive one or more configuration messages identifying a plurality of sub-slot PUCCH resources and an indication of a particular sub-slot PUCCH resource, of the plurality of sub-slot PUCCH resources, to be used for PUCCH repetition; determine, based at least in part on the one or more configuration messages, a quantity of PUCCH repetitions for transmission in the plurality of sub-slot PUCCH resources; determine, based at least in part on a scheduling of the quantity of PUCCH repetitions and one or more other transmissions, whether to modify the particular sub-slot PUCCH resource; and selectively transmit UCI based at least in part on a result of determining whether to modify the particular sub-slot PUCCH resource.

In some aspects, a non-transitory computer-readable medium may store one or more instructions for wireless communication. The one or more instructions, when executed by one or more processors of a UE, may cause the one or more processors to: receive a PUCCH resource configuration including a plurality of sub-slot PUCCH resources for the UE; determine that a sub-slot PUCCH resource, of the plurality of sub-slot PUCCH resources, for use with an uplink transmission crosses a slot boundary; and adjust the uplink transmission based at least in part on determining that the sub-slot PUCCH resource crosses the slot boundary.

In some aspects, a non-transitory computer-readable medium may store one or more instructions for wireless communication. The one or more instructions, when executed by one or more processors of a UE, may cause the one or more processors to: receive one or more configuration messages identifying a plurality of sub-slot PUCCH resources and an indication of a particular sub-slot PUCCH resource, of the plurality of sub-slot PUCCH resources, to be used for PUCCH repetition; determine, based at least in part on the one or more configuration messages, a quantity of PUCCH repetitions for transmission in the plurality of sub-slot PUCCH resources; determine, based at least in part on a scheduling of the quantity of PUCCH repetitions and one or more other transmissions, whether to modify the particular sub-slot PUCCH resource; and selectively transmit UCI based at least in part on a result of determining whether to modify the particular sub-slot PUCCH resource.

In some aspects, an apparatus for wireless communication may include means for receiving a PUCCH resource configuration including a plurality of sub-slot PUCCH resources for the UE; means for determining that a sub-slot PUCCH resource, of the plurality of sub-slot PUCCH resources, for use with an uplink transmission crosses a slot boundary; and means for adjusting the uplink transmission based at least in part on determining that the sub-slot PUCCH resource crosses the slot boundary.

In some aspects, an apparatus for wireless communication may include means for receiving one or more configuration messages identifying a plurality of sub-slot PUCCH resources and an indication of a particular sub-slot PUCCH resource, of the plurality of sub-slot PUCCH resources, to be used for PUCCH repetition; means for determining, based at least in part on the one or more configuration messages, a quantity of PUCCH repetitions for transmission in the plurality of sub-slot PUCCH resources; means for determining, based at least in part on a scheduling of the quantity of PUCCH repetitions and one or more other transmissions, whether to modify the particular sub-slot PUCCH resource; and means for selectively transmitting UCI based at least in part on a result of determining whether to modify the particular sub-slot PUCCH resource.

In some aspects, a method of wireless communication, performed by a user equipment, may include receiving a plurality of PUCCH resource configurations, wherein the plurality of PUCCH resource configurations includes a first PUCCH resource configuration for a first length PUCCH and a second PUCCH resource configuration for a second length PUCCH; identifying, while operating using the first PUCCH resource configuration, an occurrence of a threshold channel condition; and switching from the first PUCCH resource configuration to the second PUCCH resource configuration based at least in part on identifying the occurrence of the threshold channel condition.

In some aspects, a UE for wireless communication may include a memory and one or more processors coupled to the memory. The memory and the one or more processors may be configured to receive a plurality of PUCCH resource configurations, wherein the plurality of PUCCH resource configurations includes a first PUCCH resource configuration for a first length PUCCH and a second PUCCH resource configuration for a second length PUCCH; identify, while operating using the first PUCCH resource configuration, an occurrence of a threshold channel condition; and switch from the first PUCCH resource configuration to the second PUCCH resource configuration based at least in part on identifying the occurrence of the threshold channel condition.

In some aspects, a non-transitory computer-readable medium may store one or more instructions for wireless communication. The one or more instructions, when executed by one or more processors of a UE, may cause the one or more processors to receive a plurality of PUCCH resource configurations, wherein the plurality of PUCCH resource configurations includes a first PUCCH resource configuration for a first length PUCCH and a second PUCCH resource configuration for a second length PUCCH; identify, while operating using the first PUCCH resource configuration, an occurrence of a threshold channel condition; and switch from the first PUCCH resource configuration to the second PUCCH resource configuration based at least in part on identifying the occurrence of the threshold channel condition.

In some aspects, an apparatus for wireless communication may include means for receiving a plurality of PUCCH resource configurations, wherein the plurality of PUCCH resource configurations includes a first PUCCH resource configuration for a first length PUCCH and a second PUCCH resource configuration for a second length PUCCH; means for identifying, while operating using the first PUCCH resource configuration, an occurrence of a threshold channel condition; and means for switching from the first PUCCH resource configuration to the second PUCCH resource configuration based at least in part on identifying the occurrence of the threshold channel condition.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
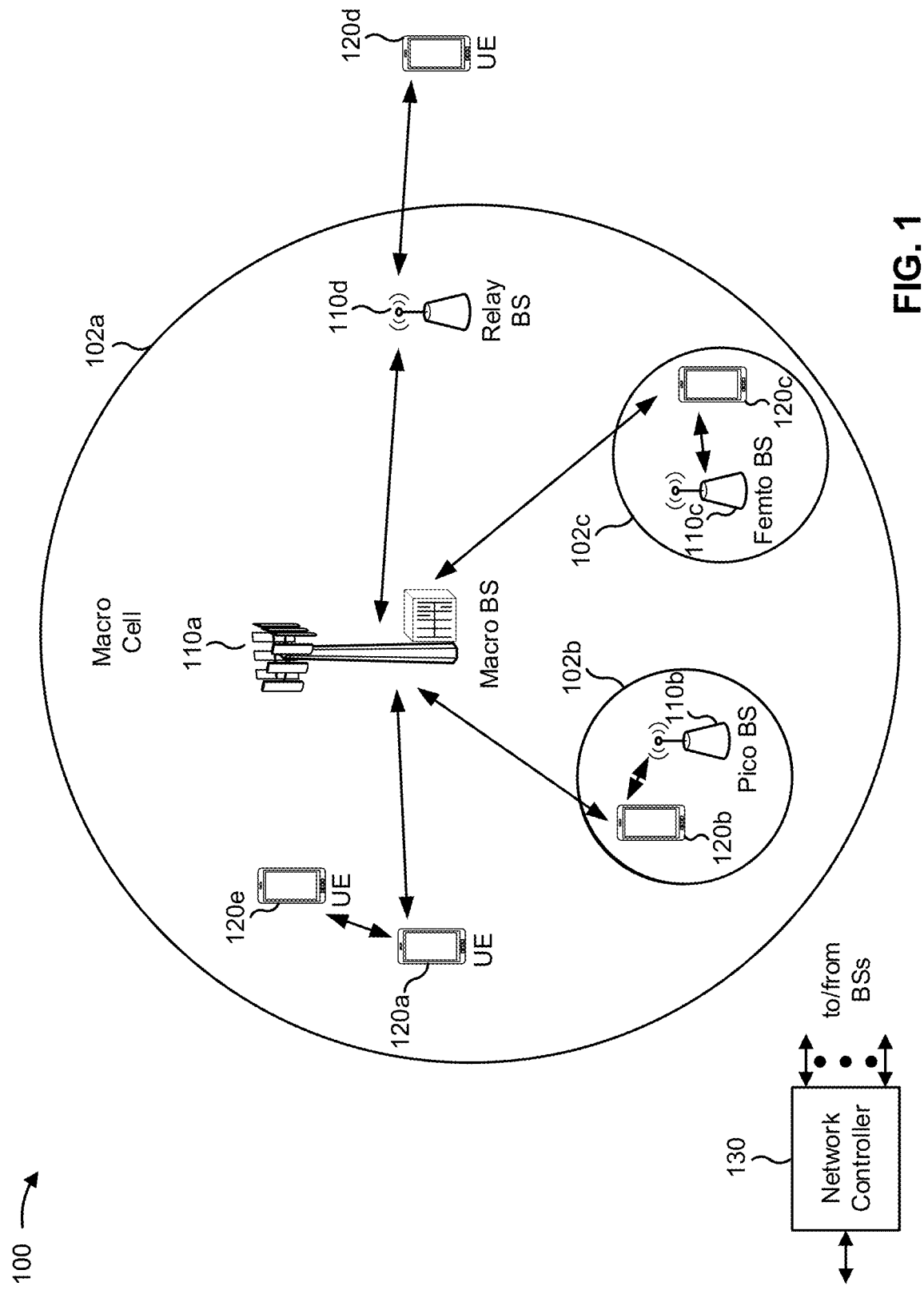
- FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
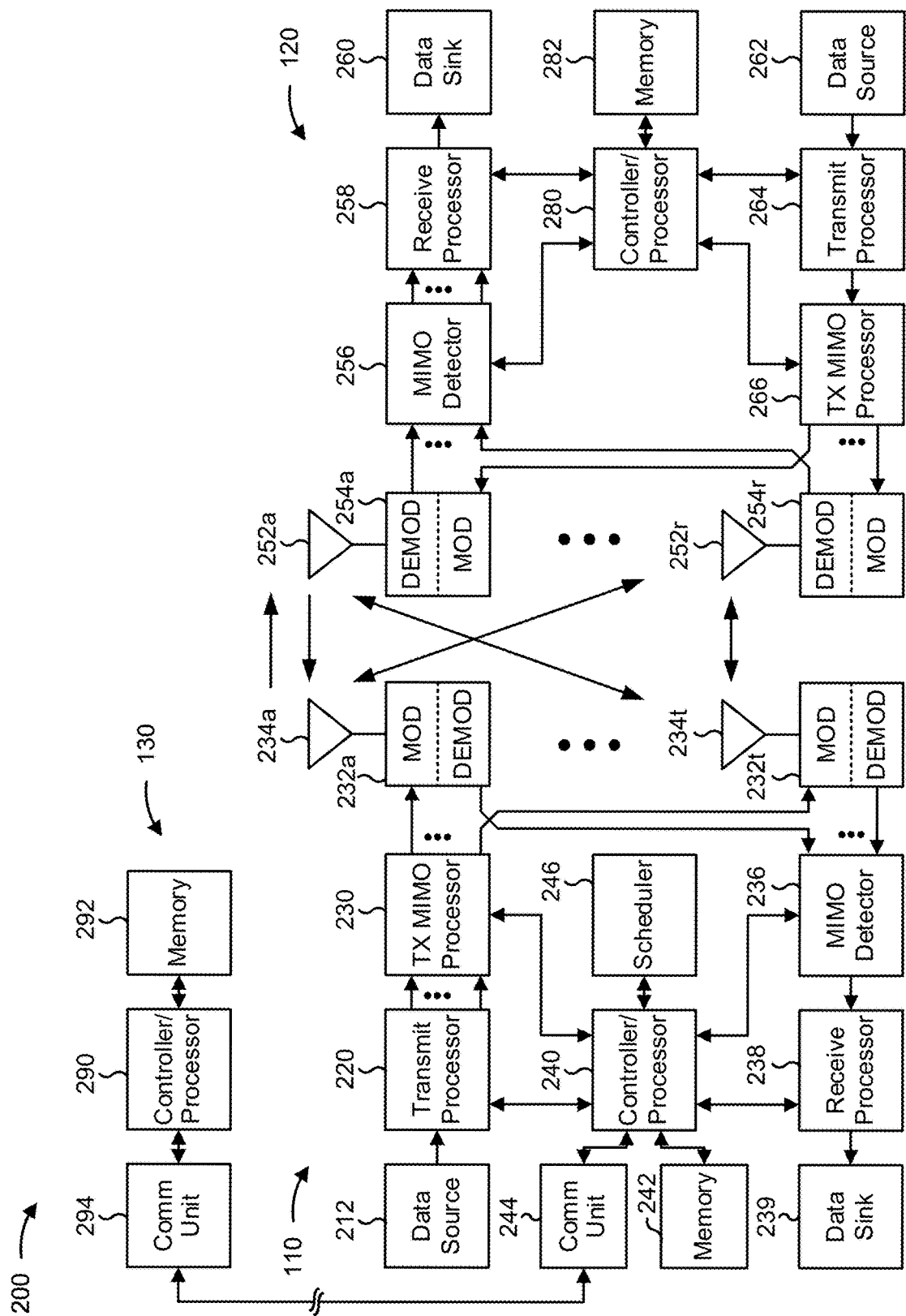
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical uplink control channel (PUCCH) resource configuration, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a PUCCH resource configuration including a plurality of sub-slot PUCCH resources for the UE; means for determining that a sub-slot PUCCH resource, of the plurality of sub-slot PUCCH resources, for use with an uplink transmission crosses a slot boundary; means for adjusting the uplink transmission based at least in part on determining that the sub-slot PUCCH resource crosses the slot boundary; and/or the like. In some aspects, UE 120 may include means for receiving one or more configuration messages identifying a plurality of sub-slot PUCCH resources and an indication of a particular sub-slot PUCCH resource, of the plurality of sub-slot PUCCH resources, to be used for PUCCH repetition; means for determining, based at least in part on the one or more configuration messages, a quantity of PUCCH repetitions for transmission in the plurality of sub-slot PUCCH resources; means for determining, based at least in part on a scheduling of the quantity of PUCCH repetitions and one or more other transmissions, whether to modify the particular sub-slot PUCCH resource; means for selectively transmitting uplink control information (UCI) based at least in part on a result of determining whether to modify the particular sub-slot PUCCH resource; and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
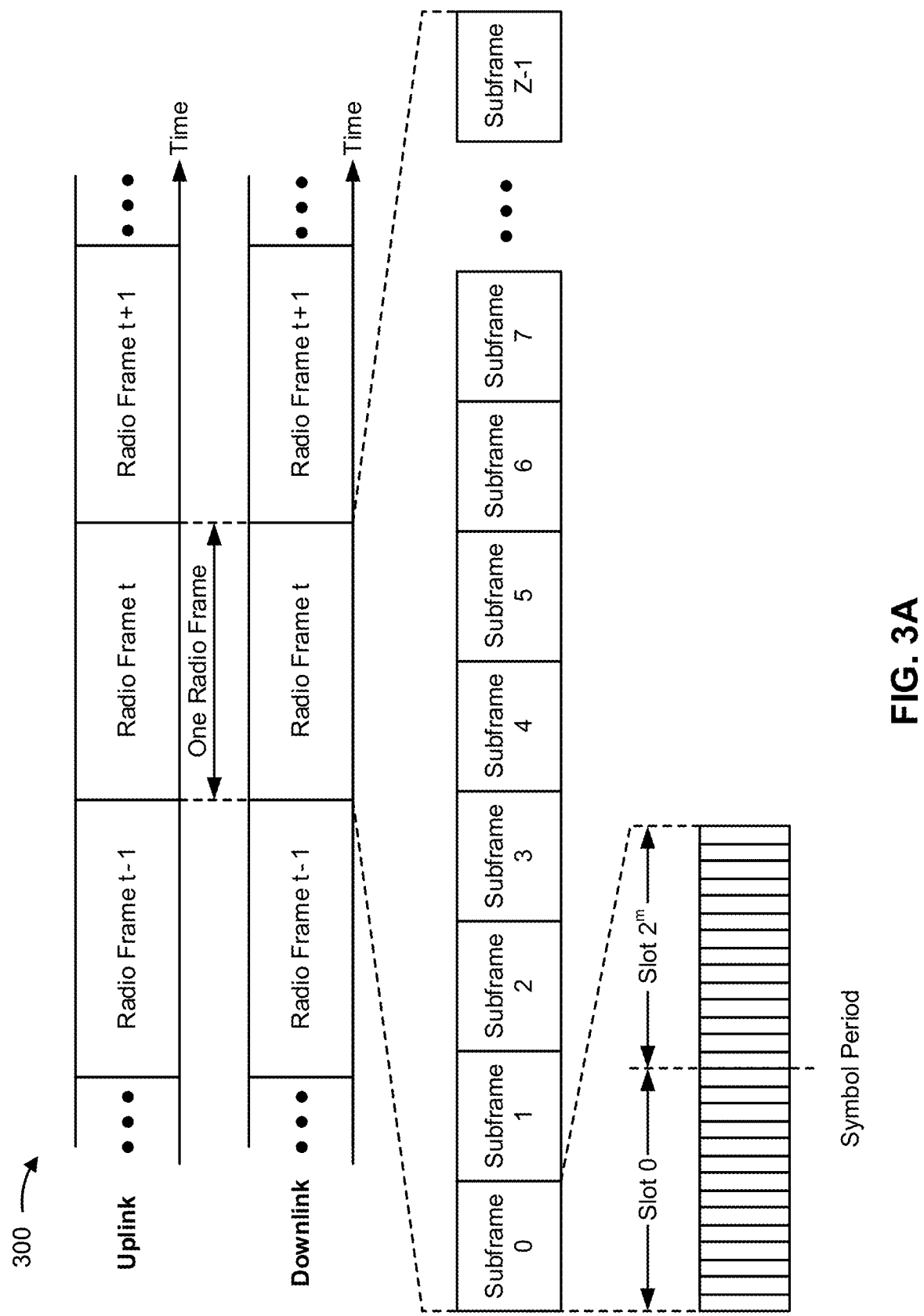
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
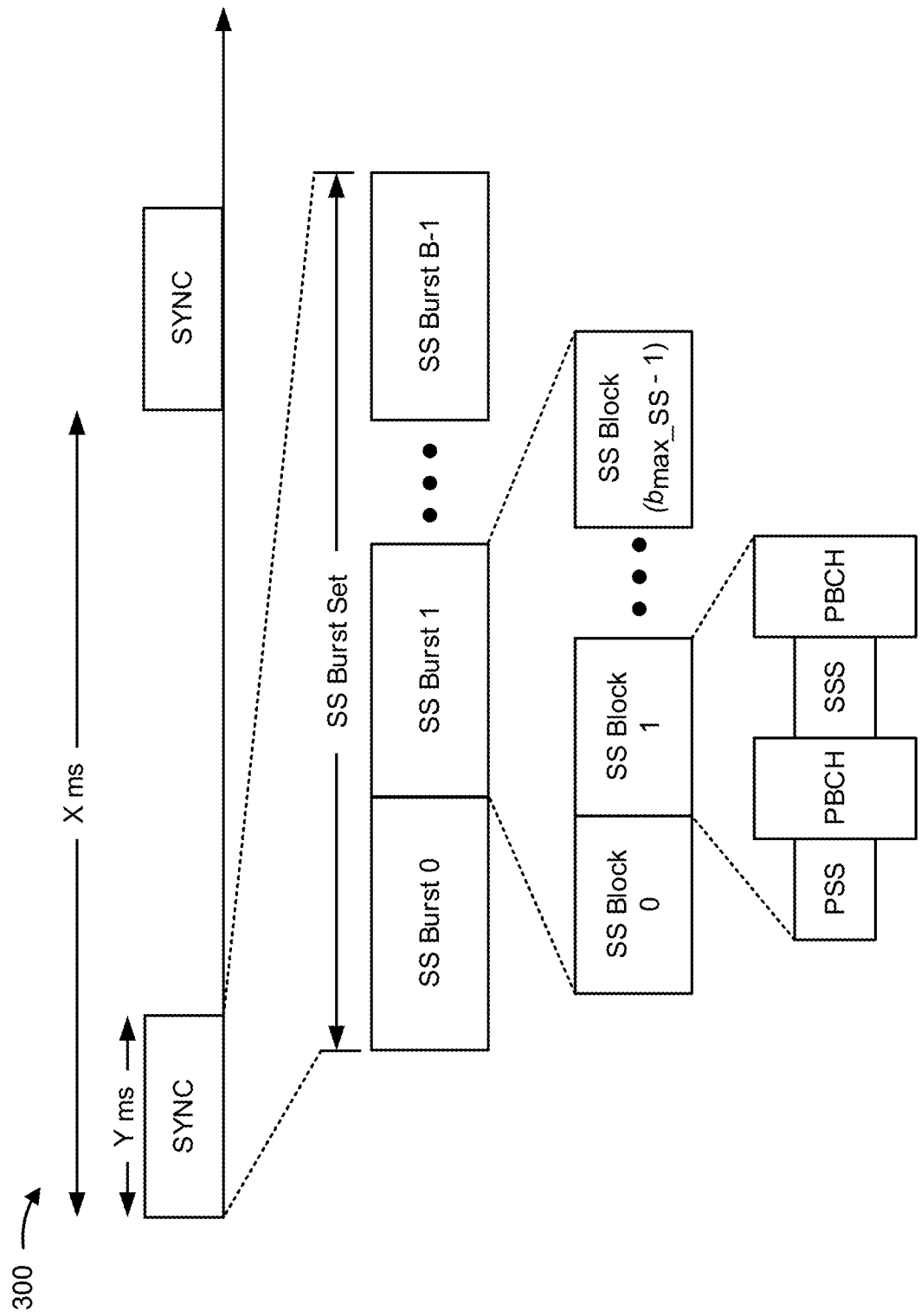
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $bb_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
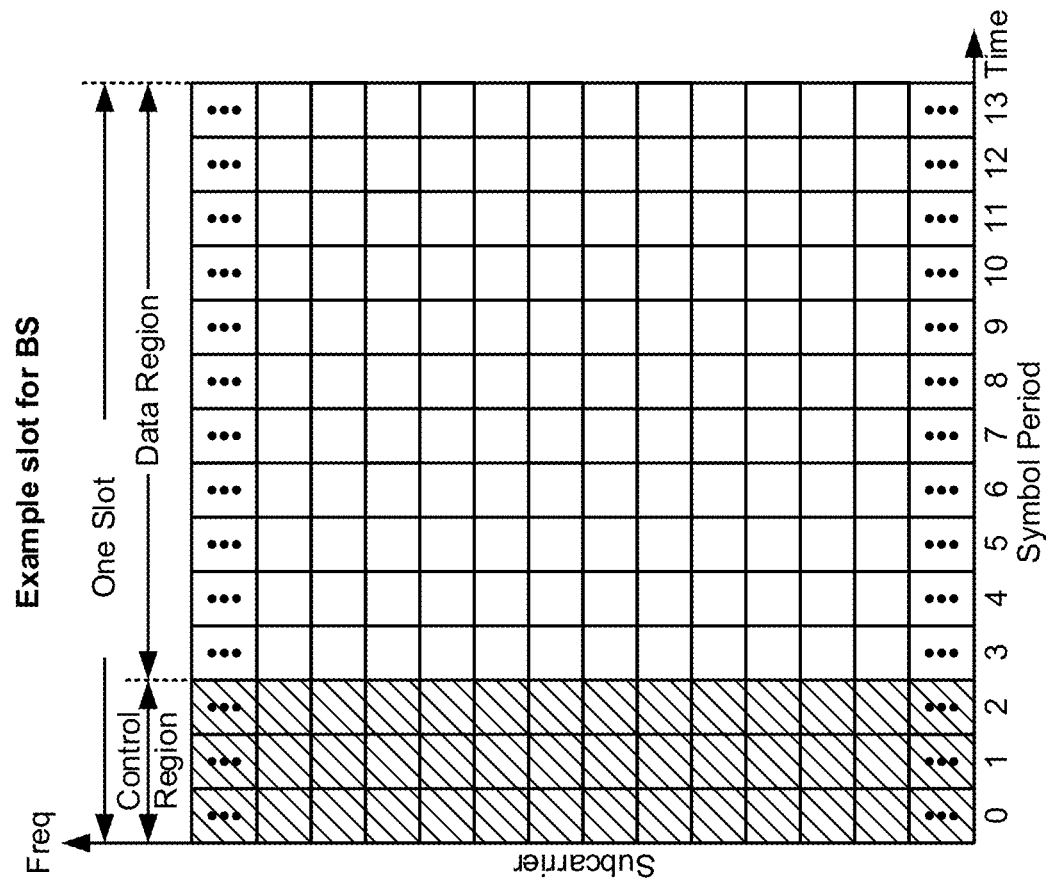
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q-1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
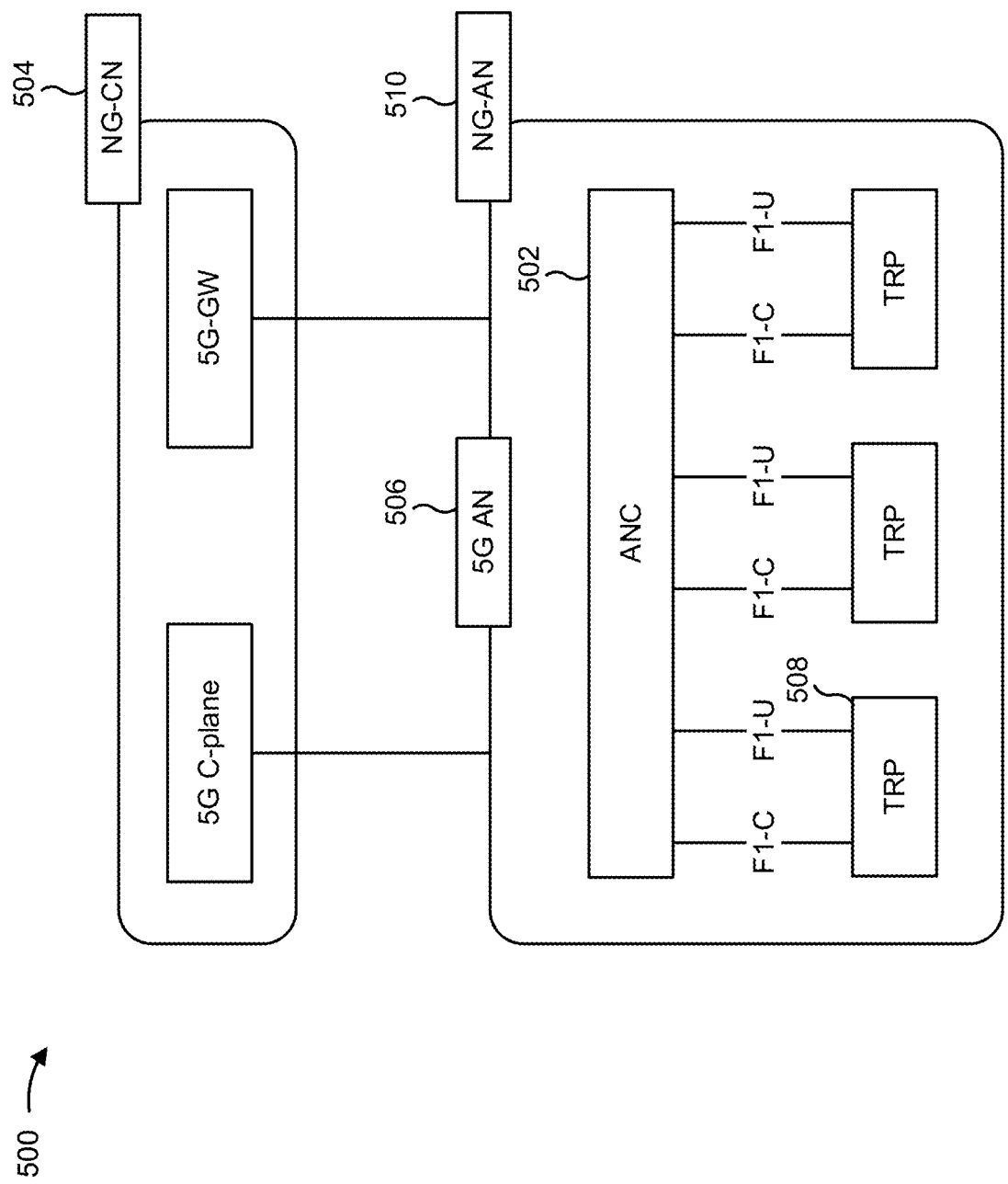
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
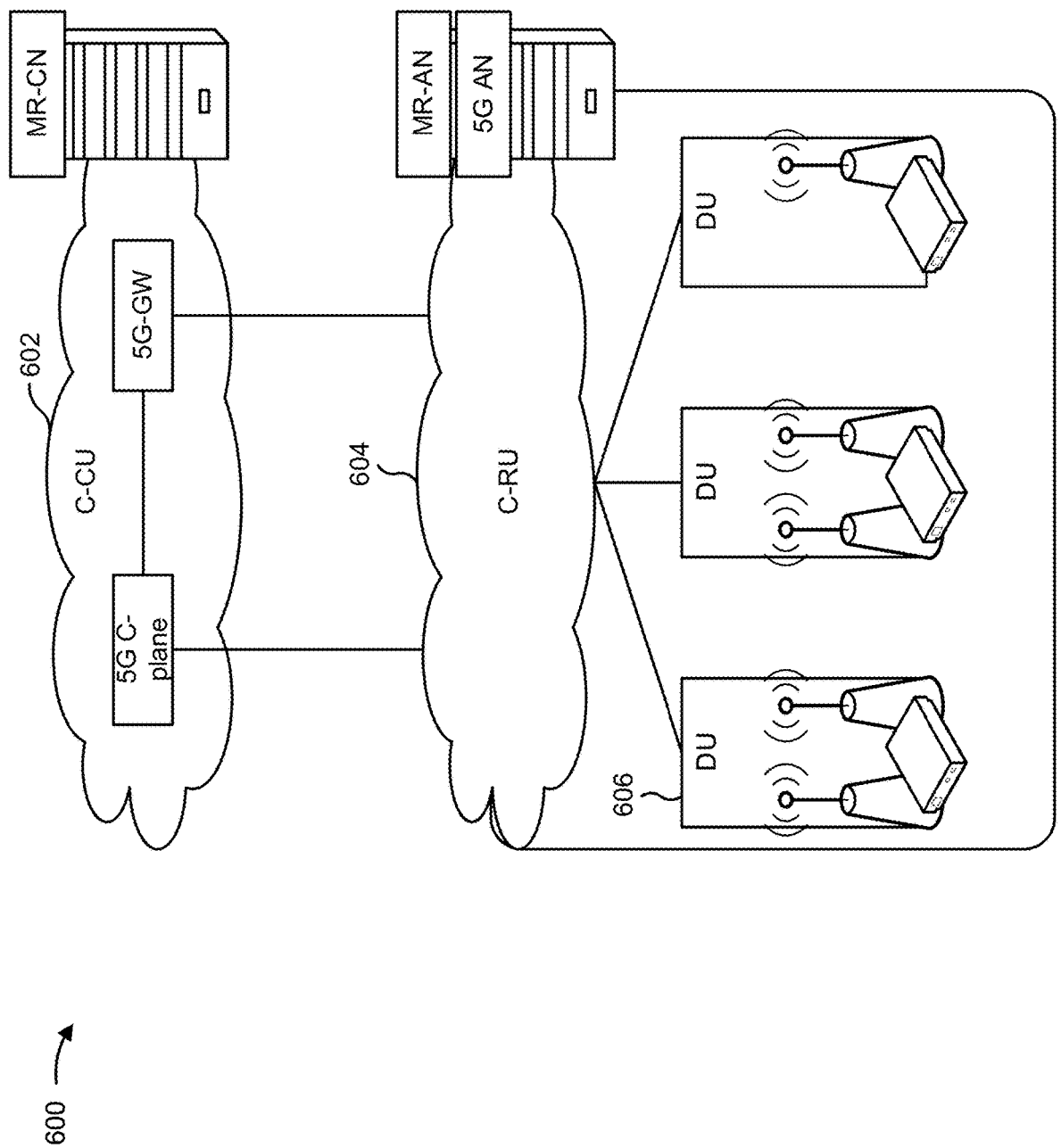
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as NR, slots may be divided into a plurality of sub-slots. For example, an uplink slot may include a plurality of sub-slots in which a UE may transmit an uplink transmission, such as a physical uplink control channel (PUCCH) transmission, a physical uplink shared channel (PUSCH) transmission, and/or the like. PUCCH resources can be scheduled within a boundary of a sub-slot. However, scheduling PUCCH resources within a boundary of a sub-slot may restrict a usage of some PUCCH resource lengths or PUCCH resource formats. In contrast, PUCCH resources can be scheduled across sub-slot boundaries. However, scheduling PUCCH resources across sub-slot boundaries may result in PUCCH resources crossing slot boundaries, which may negatively impact network performance.

Some aspects described herein enable improved PUCCH resource configuration. For example, a BS and a UE may be configured such that the UE transmits PUCCH transmissions that do not cross slot boundaries. In contrast, when the UE determines that a PUCCH resource for a PUCCH transmission crosses a slot boundary, the UE may adjust the PUCCH transmission to ensure that the PUCCH transmission does not cross the slot boundary. Further, when the UE determines that a PUCCH resource for a PUCCH repetition collides with another uplink transmission, the UE may selectively modify the PUCCH resource. In this way, the UE avoids cross-slot transmission of uplink transmissions, excess interference with other transmissions, and/or the like in a sub-slot resource configuration deployment.

Figure 7:
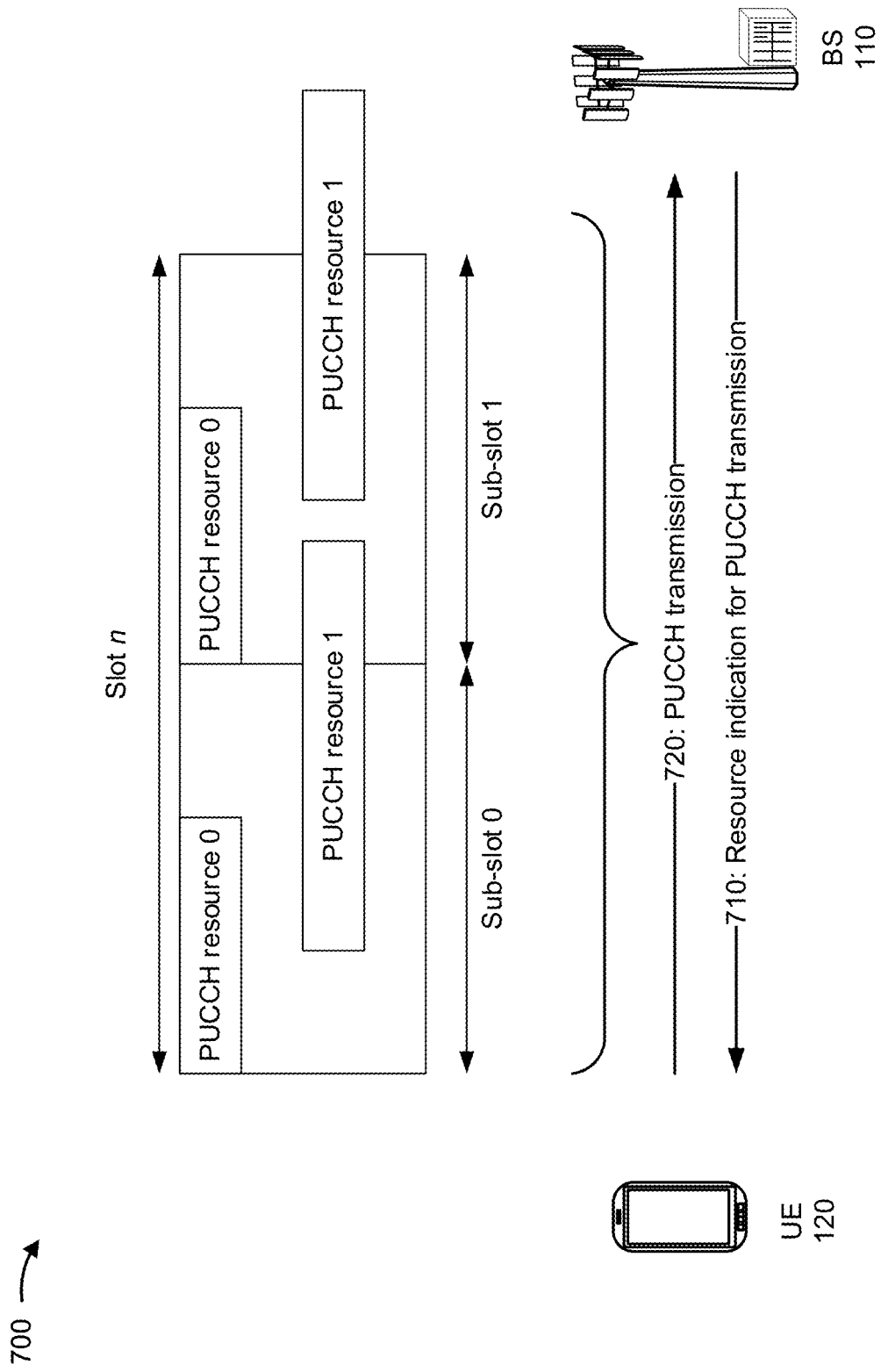
FIG. 7-9 are diagrams illustrating examples of physical uplink control channel (PUCCH) resource configuration, in accordance with various aspects of the present disclosure.

FIG. 7 is a diagram illustrating an example 700 of PUCCH resource configuration, in accordance with various aspects of the present disclosure. As shown in FIG. 7, example 700 includes a BS 110 and a UE 120.

As further shown in FIG. 7, and by reference number 710, UE 120 may receive a resource indication from BS 110. For example, UE 120 may receive a resource indication that identifies a PUCCH resource configuration including a plurality of sub-slot PUCCH resources for transmission of a PUCCH in a particular slot and/or sub-slot. In some aspects, BS 110 may configure the PUCCH resources such that transmission of the PUCCH does not cross a slot boundary. For example, with regard to PUCCH resources 0, UE 120 may be directed to transmit using a first PUCCH resource 0 in sub-slot 0 and a second PUCCH resource 0 in sub-slot 0 without the first PUCCH resource 0 or the second PUCCH resource 0 crossing a slot boundary of slot n.

In some aspects, BS 110 may configure the PUCCH resources such that transmission of the PUCCH does cross a slot boundary. For example, with regard to PUCCH resources 1, UE 120 may be directed to transmit using a first PUCCH resource in both sub-slot 0 and sub-slot 1 of slot n and using a second PUCCH resource in both sub-slot 1 of slot n and in a next sub-slot of a next slot. In this case, UE 120 may adjust the sub-slot PUCCH resource. For example, UE 120 may shorten the sub-slot PUCCH resource. In this case, when UE 120 is indicated to use PUCCH resource 1, which is configured with a particular format (e.g., PUCCH format 3) and with 6 symbols, UE 120 may determine that 2 of the symbols cross the slot boundary. As a result, UE 120 may drop the 2 symbols that cross the slot boundary. In this case, UE 120 may transmit a PUCCH repetition with the same PUCCH format (e.g., PUCCH format 3), but with a reduced quantity of symbols to avoid transmitting the PUCCH across the slot boundary. In some aspects, UE 120 may drop a portion of a PUCCH transmission based at least in part on determining that the PUCCH transmission is transmittable using a quantity of symbols that remain after adjusting the PUCCH resource.

In some aspects, UE 120 may drop an entire PUCCH transmission. For example, UE 120 may determine that a minimum quantity of symbols for transmitting the PUCCH is less than a quantity of symbols of a PUCCH resource for a particular PUCCH resource format that do not cross a slot boundary, and may determine to drop the entire PUCCH transmission. In some aspects, UE 120 may determine resource blocks for transmitting a PUCCH transmission in connection with adjusting a PUCCH resource. For example, UE 120 may determine the quantity of resource blocks for the PUCCH transmission based at least in part on a size of a payload of the PUCCH transmission, a PUCCH format of the PUCCH transmission, a maximum coding rate, a quantity of symbols after adjusting the PUCCH resource, and/or the like.

In some aspects, UE 120 may determine a slot format for slots that include sub-slots in which to transmit the PUCCH. For example, UE 120 may receive a dynamic slot format indicator (SFI) indicated by a DCI format type 2 that indicates that symbols in which UE 120 is to transmit the PUCCH is assigned as uplink symbols or as flexible symbols. In some aspects, UE 120 may determine that one or more symbols in which UE 120 is to transmit the PUCCH are assigned as downlink symbols (e.g., based at least in part on a semi-static SFI that is indicated by cell-specific signaling or RRC signaling). In this case, UE 120 may drop the one or more symbols, and may determine not to transmit a PUCCH during a sub-slot that includes the one or more symbols. Alternatively, UE 120 may drop the one or more symbols, and may determine to shorten the PUCCH to avoid the one or more symbols (e.g., to a quantity of consecutive symbols that are not assigned as downlink symbols). In this case, UE 120 may transmit the shortened PUCCH.

As further shown in FIG. 7, and by reference number 720, UE 120 may transmit one or more PUCCH transmissions using one or more PUCCH resources indicated in the resource indication. For example, UE 120 may transmit a PUCCH transmission that does not cross a sub-slot boundary based at least in part on the PUCCH transmission not being scheduled to cross the sub-slot boundary, based at least in part on shortening the PUCCH transmission to avoid crossing the sub-slot boundary, and/or the like.

As indicated above, FIG. 7 is provided as an example. Other examples may differ from what is described with respect to FIG. 7.

Figure 8:
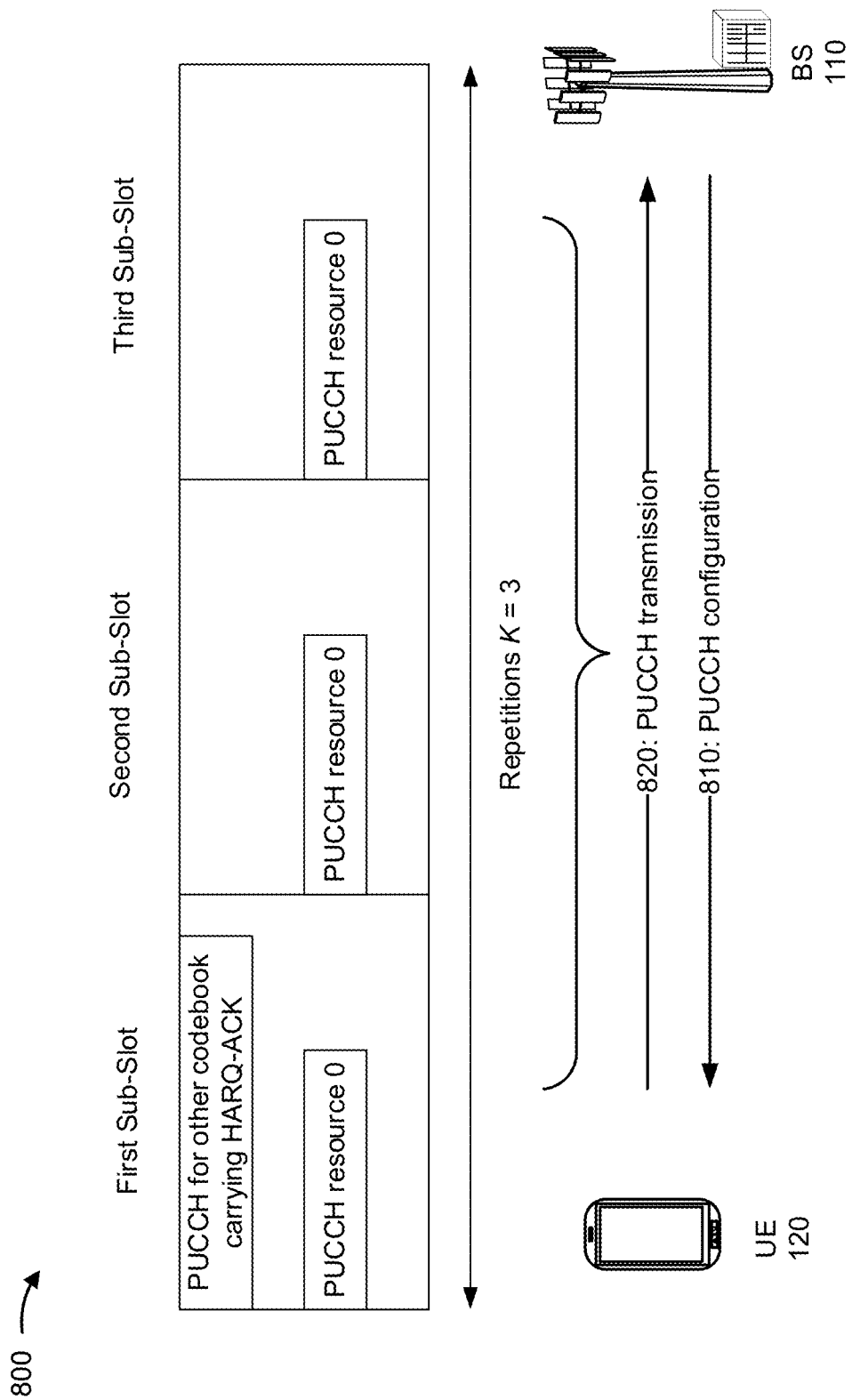

FIG. 8 is a diagram illustrating an example 800 of PUCCH resource configuration, in accordance with various aspects of the present disclosure. As shown in FIG. 8, example 800 includes a BS 110 and a UE 120.

As further shown in FIG. 8, and by reference number 810, UE 120 may receive, from BS 110, a PUCCH configuration message identifying a PUCCH resource configuration, a quantity of PUCCH repetitions to transmit, a PUCCH resource at which to start transmission of repetitions of the PUCCH transmission, and/or the like. For example, UE 120 may receive a downlink control information (DCI) message including a field explicitly identifying a quantity of PUCCH repetitions to transmit. Additionally, or alternatively, UE 120 may implicitly derive the quantity, K, of PUCCH repetitions to transmit based at least in part on the PUCCH configuration message indicating a selection of a particular PUCCH resource of, for example, a particular PUCCH resource set. In some aspects, the quantity of repetitions is semi-statically configured on a per-PUCCH resource basis, a per-PUCCH resource set basis, and/or the like.

In some aspects, UE 120 may determine a scheduling of the PUCCH resources. For example, UE 120 may determine that a collision is to occur for a PUCCH transmission transmitted using a particular PUCCH resource configured by BS 110. In this case, the PUCCH transmission may be scheduled to collide with another PUCCH (e.g., associated with a different codebook than the PUCCH transmission), a PUSCH transmission, and/or the like.

As further shown in FIG. 8, and by reference number 820, UE 120 may transmit a plurality of repetitions of the PUCCH based at least in part on the PUCCH configuration message. For example, UE 120 may transmit a first PUCCH repetition in a first PUCCH resource in a first sub-slot, a second PUCCH repetition in a second PUCCH resource in a second sub-slot, and/or the like. In some aspects, UE 120 may reuse a same PUCCH resource in a set of consecutive slots corresponding to the particular quantity of PUCCH repetitions to transmit the particular quantity of PUCCH repetitions. For example, as shown, UE 120 may transmit a PUCCH in a PUCCH resource 0 of a first sub-slot, a second sub-slot, and a third sub-slot.

In some aspects, UE 120 may determine that a PUCCH collides with another transmission and may perform a collision action to modify a sub-slot PUCCH resource. For example, UE 120 may determine that PUCCH resource 0 collides with a PUSCH. In this case, UE 120 may multiplex a HARQ-ACK of a PUCCH that is to be transmitted using PUCCH resource 0 onto the PUSCH. In some aspects, UE 120 may continue to use PUCCH resource 0 in subsequent sub-slots for subsequent repetitions of the PUCCH transmission after multiplexing the HARQ-ACK onto the PUSCH.

Additionally, or alternatively, UE 120 may determine that PUCCH resource 0 collides with another PUCCH. For example, as shown, UE 120 may determine that PUCCH resource 0 collides with a PUCCH that is conveying uplink control information (e.g., a HARQ-ACK for another codebook, a paging channel state information (P-CSI) message, and/or the like). In this case, UE 120 may multiple HARQ-ACK bits in the first sub-slot to generate an aggregated payload of the PUCCH repetition and the other PUCCH of the other codebook, and may transmit the aggregated payload in the first sub-slot. In subsequent slots, UE 120 may continue to use PUCCH resource 0 for repetitions of the PUCCH.

As indicated above, FIG. 8 is provided as an example. Other examples may differ from what is described with respect to FIG. 8.

Figure 9:
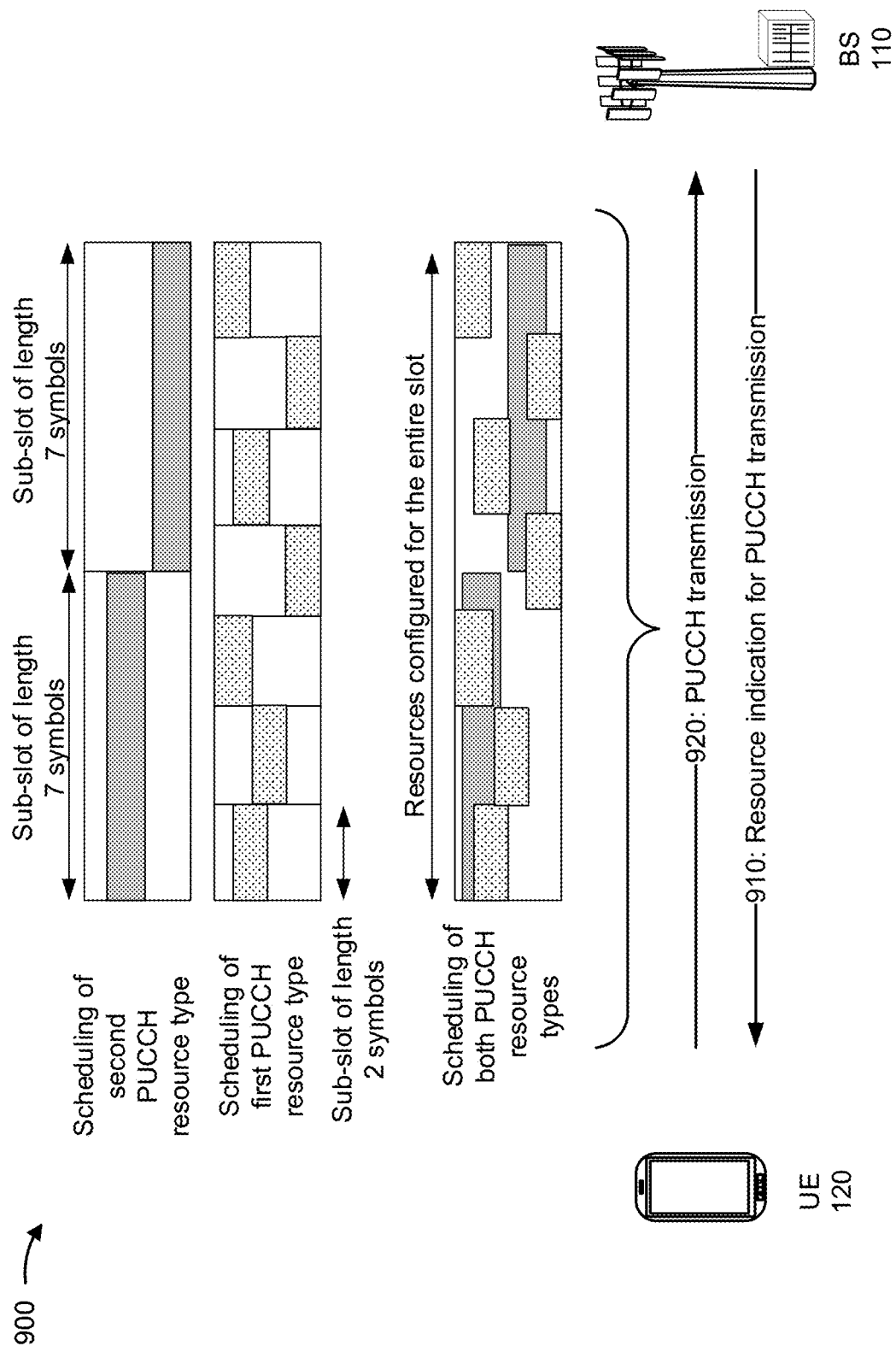

FIG. 9 is a diagram illustrating an example 900 of PUCCH resource configuration, in accordance with various aspects of the present disclosure. As shown in FIG. 9, example 900 includes a BS 110 and a UE 120.

As further shown in FIG. 9, and by reference number 910, UE 120 may receive a resource indication for PUCCH transmission. For example, UE 120 may receive information configuring a first type of PUCCH resources for a first sub-slot length of X symbols (e.g., 2 symbols) and/or a second type of PUCCH resources a second sub-slot length of Y symbols (e.g., 7 symbols). In some aspects, UE 120 may select a particular PUCCH resource configuration from the first type of PUCCH resources or the second type of PUCCH resources. For example, UE 120 may select the particular PUCCH resource configuration based at least in part on a payload for transmission, the resource indicator (e.g., a PUCCH resource indicator), a control channel element (CCE) index, a sub-slot length, or a sub-slot granularity, and/or the like.

As further shown in FIG. 9, and by reference number 920, UE 120 may transmit the PUCCH transmission in accordance with the resource indication. For example, UE 120 may transmit a particular length of a PUCCH, thereby enabling adaptation to changing channel conditions. In some aspects, UE 120 may determine a sub-slot in which to transmit the PUCCH. For example, based at least in part on a sub-slot length of the PUCCH (e.g., based at least in part on the type of the PUCCH resources) and/or a sub-slot granularity, UE 120 may determine a sub-slot K1 (not shown) parameter. For example, each PUCCH resource may be associated with a particular sub-slot duration. As a result, when a particular PUCCH resource is selected (e.g., based at least in part on a payload, a PUCCH resource indicator (PRI), a control channel element (CCE) index, and/or the like), UE 120 may determine an RRC configuration of the particular PUCCH resource and thereby determine a value for K1 for the particular PUCCH resource.

In some aspects, UE 120 may determine a sub-slot at which to transmit the PUCCH based at least in part on the sub-slot K1 parameter and a sub-slot location at which a PDSCH is transmitted. Additionally, or alternatively, UE 120 may determine a codebook and/or a sub-slot length based at least in part on a downlink control information (DCI) indication. As an example, for more than 2 codebooks, the PUCCH transmission of some of the codebooks may have a common priority. For example, 3 codebooks with different sub-slot lengths may be configured as a codebook-1 with a slot level K1 for eMBB-types of applications, a codebook-2 with a 2-symbol sub-slot duration for URLLC-types of applications, and a codebook-3 with a 7-symbol sub-slot duration for URLLC-types of applications. In this case, a 2-bit indication may be used, such as using 00 for codebook-1, 01 for codebook-2, and 10 for codebook-3. Further, UE 120 may determine based on a received RRC signal that codebook-2 and codebook-3 have the same priority. As a result, when PUCCH resources associated with codebook-2 and codebook-3 collide, UE 120 may perform an action based at least in part on the codebooks having a common priority. For example, in a case of a collision, UE 120 may multiplex HARQ-ACK feedback of the codebooks rather than dropping HARQ-ACK feedback of one of the codebooks.

As indicated above, FIG. 9 is provided as an example. Other examples may differ from what is described with respect to FIG. 9.

Figure 10:
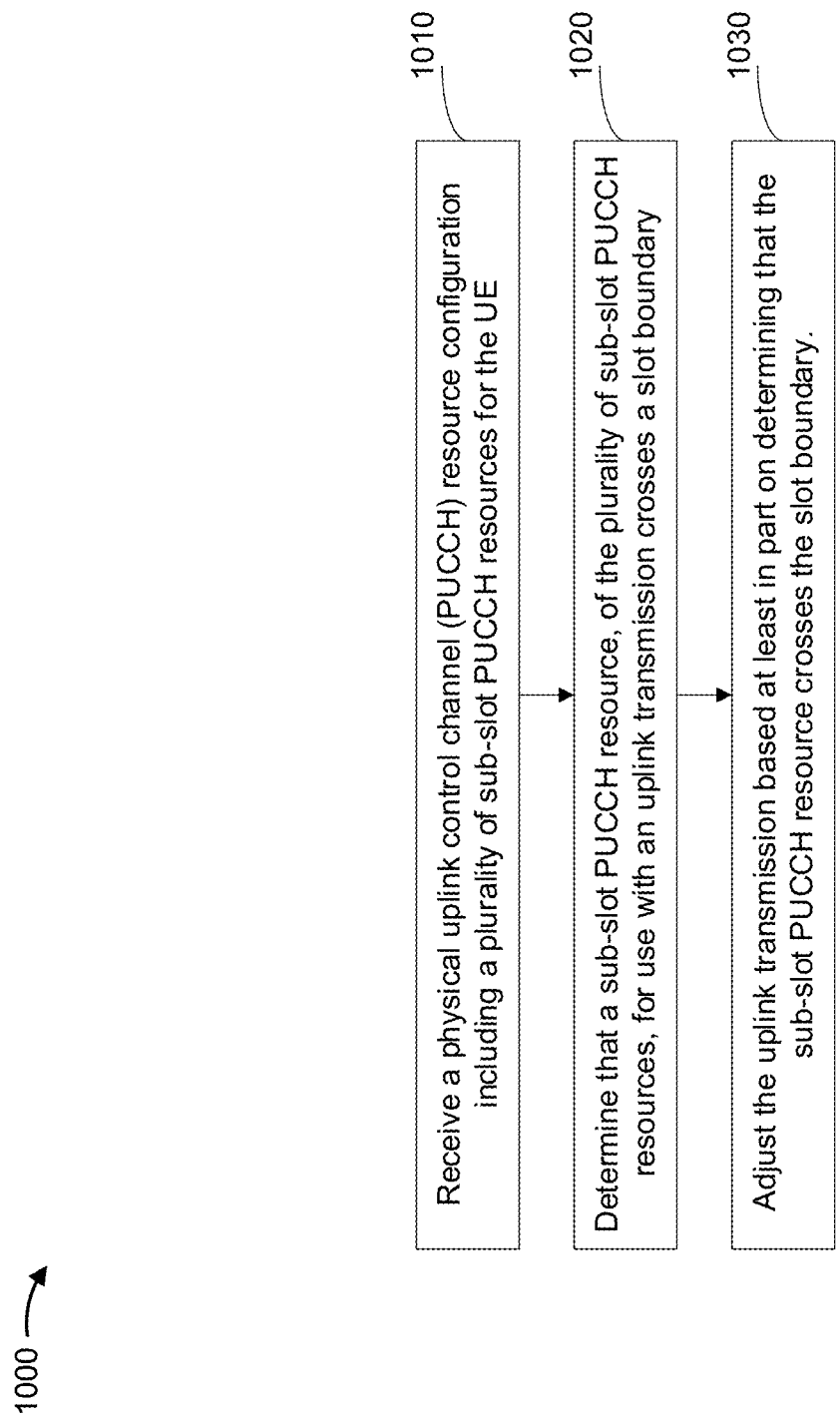
FIGS. 10-12 are diagrams illustrating example processes performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with PUCCH resource configuration.

As shown in FIG. 10, in some aspects, process 1000 may include receiving a PUCCH resource configuration including a plurality of sub-slot PUCCH resources for the UE (block 1010). For example, the UE (e.g., using receive processor 258, transmit processor 264, controller/processor 280, memory 282, and/or the like) may receive a PUCCH resource configuration including a plurality of sub-slot PUCCH resources for the UE, as described above.

As further shown in FIG. 10, in some aspects, process 1000 may include determining that a sub-slot PUCCH resource, of the plurality of sub-slot PUCCH resources, for use with an uplink transmission crosses a slot boundary (block 1020). For example, the UE (e.g., using receive processor 258, transmit processor 264, controller/processor 280, memory 282, and/or the like) may determine that a sub-slot PUCCH resource, of the plurality of sub-slot PUCCH resources, for use with an uplink transmission crosses a slot boundary, as described above.

As further shown in FIG. 10, in some aspects, process 1000 may include adjusting the uplink transmission based at least in part on determining that the sub-slot PUCCH resource crosses the slot boundary (block 1030). For example, the UE (e.g., using receive processor 258, transmit processor 264, controller/processor 280, memory 282, and/or the like) may adjust the uplink transmission based at least in part on determining that the sub-slot PUCCH resource crosses the slot boundary, as described above.

Process 1000 may include additional aspects, such as any single aspect or any combination of aspects described below and/or in connection with one or more other processes described elsewhere herein.

In a first aspect, adjusting the uplink transmission includes dropping at least a portion of the uplink transmission such that the uplink transmission does not cross the slot boundary.

In a second aspect, alone or in combination with the first aspect, adjusting the uplink transmission includes modifying a quantity of uplink symbols of a particular uplink control format associated with the plurality of sub-slot PUCCH resources such that the uplink transmission does not cross the slot boundary; and transmitting the uplink transmission on the sub-slot PUCCH resource in the particular uplink control format based at least in part on modifying the quantity of uplink symbols.

In a third aspect, alone or in combination with one or more of the first and second aspects, modifying the quantity of uplink symbols includes determining that the uplink transmission is transmittable on a particular quantity of uplink symbols that is greater than or equal to a minimum quantity of symbols associated with the particular uplink control format; and reducing the quantity of uplink symbols based at least in part on the particular quantity of uplink symbols.

In a fourth aspect, alone or in combination with one or more of the first through third aspects, modifying the quantity of uplink symbols includes selecting a quantity of resource blocks (RBs) for the uplink transmission based at least in part on at least one of a payload size for the uplink transmission, a maximum coding rate, or the quantity of uplink symbols after modifying the quantity of uplink symbols.

In a fifth aspect, alone or in combination with one or more of the first through fourth aspects, transmitting the uplink transmission includes transmitting a plurality of repetitions of the PUCCH in consecutive sub-slots such that each repetition of the plurality of repetitions does not cross a slot boundary.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
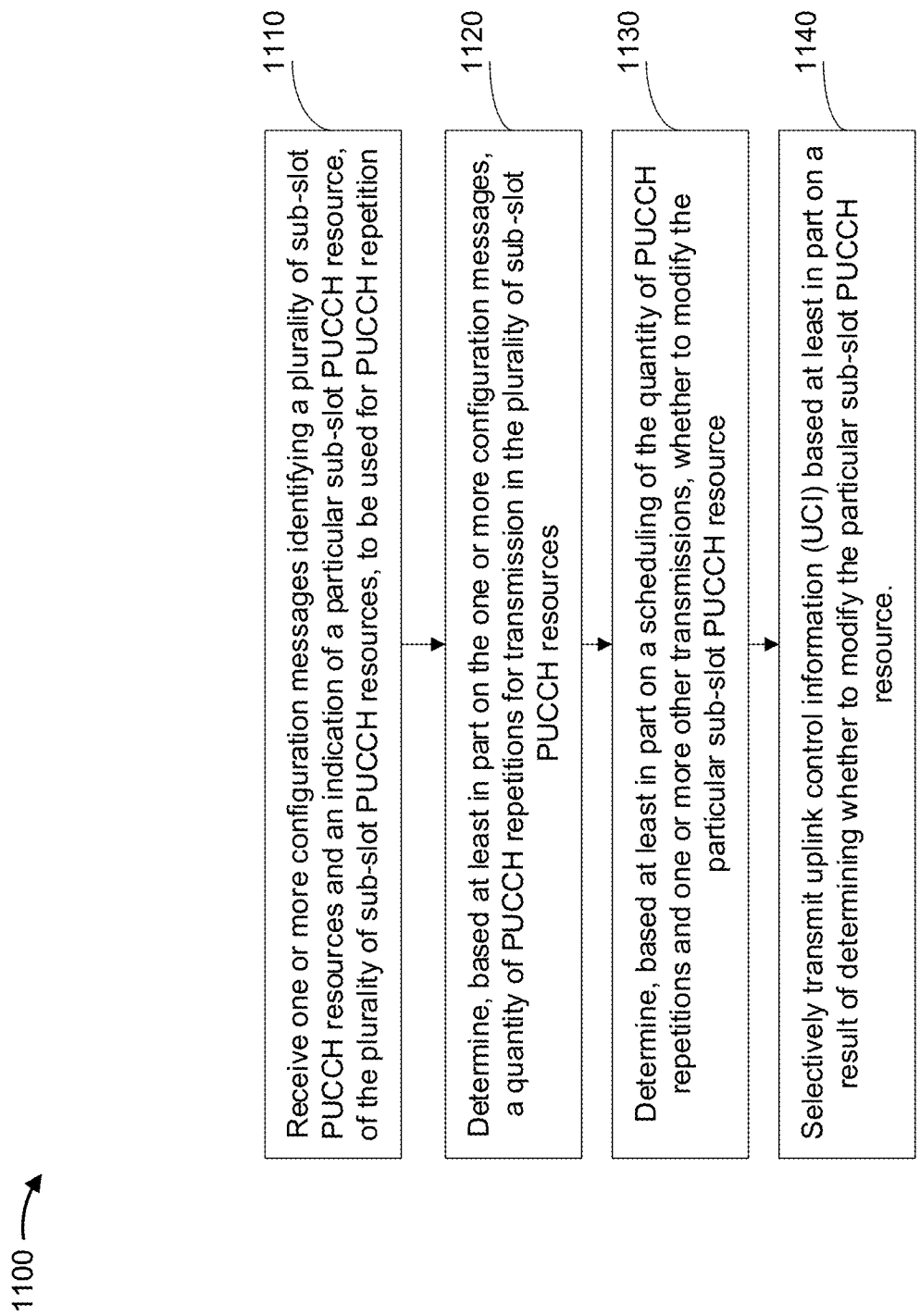

FIG. 11 is a diagram illustrating an example process 1100 performed, for example, by a UE, in accordance with various aspects of the present disclosure. Example process 1100 is an example where a UE (e.g., UE 120 and/or the like) performs operations associated with PUCCH resource configuration.

As shown in FIG. 11, in some aspects, process 1100 may include receiving one or more configuration messages identifying a plurality of sub-slot PUCCH resources and an indication of a particular sub-slot PUCCH resource, of the plurality of sub-slot PUCCH resources, to be used for PUCCH repetition (block 1110). For example, the UE (e.g., using receive processor 258, transmit processor 264, controller/processor 280, memory 282, and/or the like) may receive one or more configuration messages identifying a plurality of sub-slot PUCCH resources and an indication of a particular sub-slot PUCCH resource, of the plurality of sub-slot PUCCH resources, to be used for PUCCH repetition, as described above.

As further shown in FIG. 11, in some aspects, process 1100 may include determining, based at least in part on the one or more configuration messages, a quantity of PUCCH repetitions for transmission in the plurality of sub-slot PUCCH resources (block 1120). For example, the UE (e.g., using receive processor 258, transmit processor 264, controller/processor 280, memory 282, and/or the like) may determine, based at least in part on the one or more configuration messages, a quantity of PUCCH repetitions for transmission in the plurality of sub-slot PUCCH resources, as described above.

As further shown in FIG. 11, in some aspects, process 1100 may include determining, based at least in part on a scheduling of the quantity of PUCCH repetitions and one or more other transmissions, whether to modify the particular sub-slot PUCCH resource (block 1130). For example, the UE (e.g., using receive processor 258, transmit processor 264, controller/processor 280, memory 282, and/or the like) may determine, based at least in part on a scheduling of the quantity of PUCCH repetitions and one or more other transmissions, whether to modify the particular sub-slot PUCCH resource, as described above.

As further shown in FIG. 11, in some aspects, process 1100 may include selectively transmitting uplink control information (UCI) based at least in part on a result of determining whether to modify the particular sub-slot PUCCH resource (block 1140). For example, the UE (e.g., using receive processor 258, transmit processor 264, controller/processor 280, memory 282, and/or the like) may selectively transmit UCI based at least in part on a result of determining whether to modify the particular sub-slot PUCCH resource, as described above.

Process 1100 may include additional aspects, such as any single aspect or any combination of aspects described below and/or in connection with one or more other processes described elsewhere herein.

In a first aspect, the particular sub-slot PUCCH resource is a sequentially first sub-slot PUCCH resource of the plurality of sub-slot PUCCH resources.

In a second aspect, alone or in combination with the first aspect, the UCI includes hybrid automatic repeat request (HARQ) acknowledgement (ACK) feedback.

In a third aspect, alone or in combination with one or more of the first and second aspects, determining whether to modify the particular sub-slot PUCCH resource includes determining a collision with a physical uplink shared channel (PUSCH) on the particular sub-slot PUCCH resource; multiplexing the HARQ-ACK feedback on the PUSCH based at least in part on determining the collision.

In a fourth aspect, alone or in combination with one or more of the first through third aspects, the PUCCH repetitions are associated with a particular codebook. In some aspects, determining whether to modify the particular sub-slot PUCCH resource includes determining a collision with another PUCCH associated with a second codebook on the particular sub-slot PUCCH resource; and multiplexing the HARQ-ACK feedback with the other PUCCH based at least in part on determining the collision. In some aspects, selectively transmitting the UCI includes transmitting an aggregated payload of the PUCCH repetitions and the other PUCCH based at least in part on multiplexing the HARQ-ACK feedback with the other PUCCH.

In a fifth aspect, alone or in combination with one or more of the first through fourth aspects, determining whether to modify the particular sub-slot PUCCH resource includes determining that at least one symbol of the particular sub-slot PUCCH resource is configured as a downlink symbol in a slot. In some aspects, selectively transmitting the UCI includes dropping transmission of the UCI on the particular sub-slot PUCCH resource based at least in part on multiplexing the HARQ-ACK feedback on the PUSCH.

In a sixth aspect, alone or in combination with one or more of the first through fifth aspects, at least one of the one or more configuration messages is a downlink control information (DCI) message or a radio resource control (RRC) message.

In a seventh aspect, alone or in combination with one or more of the first through sixth aspects, process 1100 includes determining that a sub-slot PUCCH resource crosses a slot boundary; and adjusting the UCI based at least in part on determining that the particular sub-slot PUCCH resource crosses the slot boundary. In some aspects, selectively transmitting the UCI includes selectively transmitting the UCI based at least in part on adjusting the UCI.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
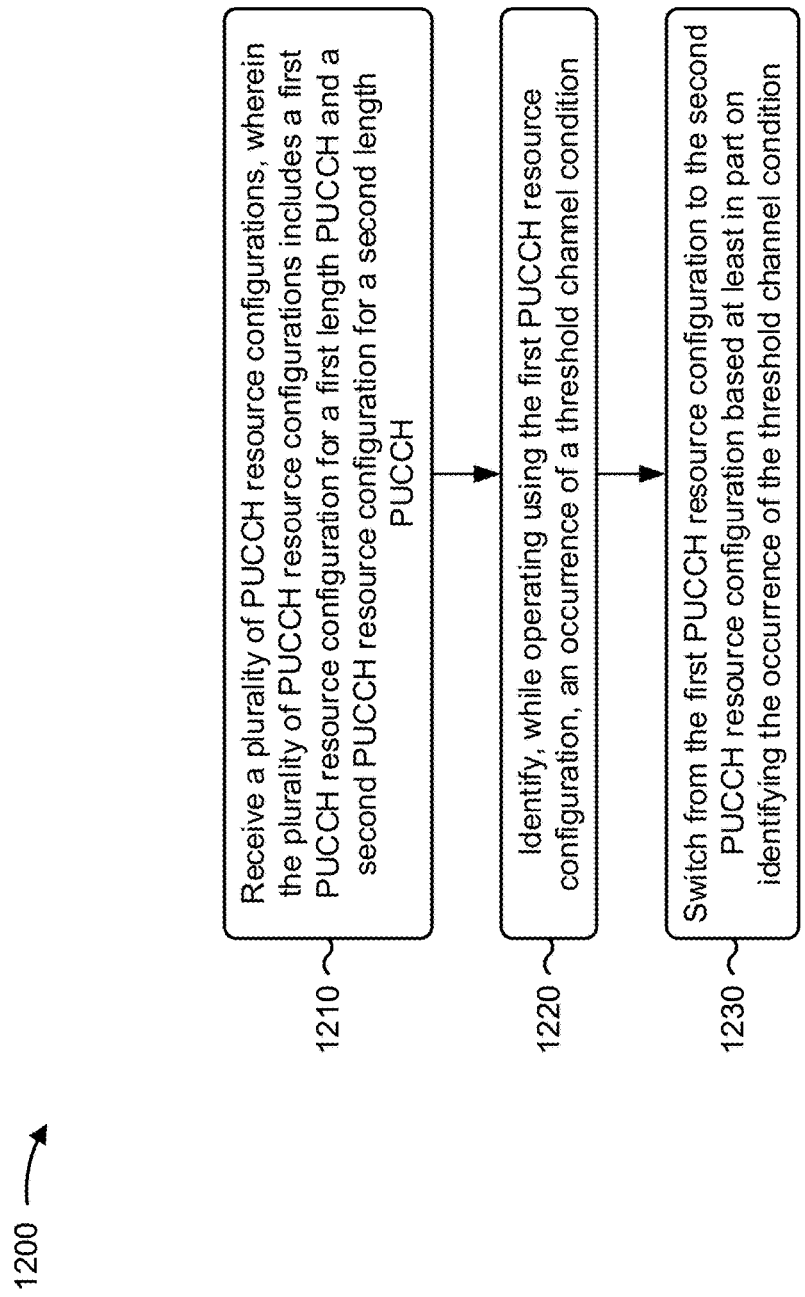

FIG. 12 is a diagram illustrating an example process 1200 performed, for example, by a UE, in accordance with various aspects of the present disclosure. Example process 1200 is an example where the UE (e.g., UE 120 and/or the like) performs operations associated with PUCCH resource configuration.

As shown in FIG. 12, in some aspects, process 1200 may include receiving a plurality of PUCCH resource configurations, wherein the plurality of PUCCH resource configurations includes a first PUCCH resource configuration for a first length PUCCH and a second PUCCH resource configuration for a second length PUCCH (block 1210). For example, the UE (e.g., using receive processor 258, transmit processor 264, controller/processor 280, memory 282, and/or the like) may receive a plurality of PUCCH resource configurations, as described above. In some aspects, the plurality of PUCCH resource configurations includes a first PUCCH resource configuration for a first length PUCCH and a second PUCCH resource configuration for a second length PUCCH.

As further shown in FIG. 12, in some aspects, process 1200 may include identifying, while operating using the first PUCCH resource configuration, an occurrence of a threshold channel condition (block 1220). For example, the UE (e.g., using receive processor 258, transmit processor 264, controller/processor 280, memory 282, and/or the like) may identify, while operating using the first PUCCH resource configuration, an occurrence of a threshold channel condition, as described above.

As further shown in FIG. 12, in some aspects, process 1200 may include switching from the first PUCCH resource configuration to the second PUCCH resource configuration based at least in part on identifying the occurrence of the threshold channel condition (block 1230). For example, the UE (e.g., using receive processor 258, transmit processor 264, controller/processor 280, memory 282, and/or the like) may switch from the first PUCCH resource configuration to the second PUCCH resource configuration based at least in part on identifying the occurrence of the threshold channel condition, as described above.

Process 1200 may include additional aspects, such as any single aspect or any combination of aspects described below and/or in connection with one or more other processes described elsewhere herein.

In a first aspect, at least one PUCCH resource of the plurality of PUCCH resource configurations is configured on a per-slot basis.

In a second aspect, alone or in combination with the first aspect, the first length PUCCH is a first sub-slot length and the second length PUCCH is a second sub-slot length.

In a third aspect, alone or in combination with one or more of the first and second aspects, process 1200 includes selecting the first PUCCH resource configuration based at least in part on at least one of a payload, a PUCCH resource indicator, or a control channel element index.

In a fourth aspect, alone or in combination with one or more of the first through third aspects, a sub-slot parameter is based at least in part on a selected PUCCH resource of the plurality of PUCCH resource configurations.

In a fifth aspect, alone or in combination with one or more of the first through fourth aspects, process 1200 includes transmitting a PUCCH communication based at least in part on switching to the second PUCCH resource configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a downlink control information (DCI) message, the DCI message identifying a particular sub-slot physical uplink control channel (PUCCH) resource of a plurality of sub-slot PUCCH resources at which to start transmission;
   determining, based at least in part on the DCI message, a quantity of PUCCH repetitions to transmit; and
   transmitting uplink control information (UCI) in the quantity of PUCCH repetitions, wherein each PUCCH repetition in the quantity of PUCCH repetitions is transmitted in a same PUCCH resource in each of a set of consecutive sub-slots, and wherein each PUCCH repetition in the quantity of PUCCH repetitions does not cross a slot boundary.

2. The method of claim 1, wherein the particular sub-slot PUCCH resource is a sequentially first sub-slot PUCCH resource of the plurality of sub-slot PUCCH resources.

3. The method of claim 1, wherein the UCI includes hybrid automatic repeat request (HARQ) acknowledgement (ACK) feedback.

4. The method of claim 1, further comprising:
   determining that a sub-slot PUCCH resource crosses a slot boundary; and
   adjusting the UCI based at least in part on determining that the particular sub-slot PUCCH resource crosses the slot boundary, wherein the UCI is transmitted further based at least in part on adjusting the UCI.

5. The method of claim 1, wherein the quantity of PUCCH repetitions is determined based on the DCI message identifying the particular sub-slot PUCCH resource.

6. The method of claim 1, wherein the UCI is transmitted on the particular sub-slot PUCCH resource.

7. The method of claim 1, wherein the quantity of PUCCH repetitions is determined further based on one or more configuration messages that include a radio resource control (RRC) message.

8. The method of claim 1, wherein the particular sub-slot PUCCH resource is used for transmitting the UCI further based on a radio resource control (RRC) configuration.

9. A user equipment (UE) for wireless communication, comprising:
   a memory; and
   one or more processors, coupled to the memory, configured to:
   receive a downlink control information (DCI) message, the DCI message identifying a particular sub-slot physical uplink control channel (PUCCH) resource of a plurality of sub-slot PUCCH resources at which to start transmission;
   determine, based at least in part on the DCI message, a quantity of PUCCH repetitions to transmit; and
   transmit uplink control information (UCI) in the quantity of PUCCH repetitions, wherein each PUCCH repetition in the quantity of PUCCH repetitions is transmitted in a same PUCCH resource in each of a set of consecutive sub-slots, and wherein each PUCCH repetition in the quantity of PUCCH repetitions does not cross a slot boundary.

10. The UE of claim 9, wherein the particular sub-slot PUCCH resource is a sequentially first sub-slot PUCCH resource of the plurality of sub-slot PUCCH resources.

11. The UE of claim 9, wherein the UCI includes hybrid automatic repeat request (HARQ) acknowledgement (ACK) feedback.

12. The UE of claim 9, wherein the quantity of PUCCH repetitions is determined based on the DCI message identifying the particular sub-slot PUCCH resource.

13. The UE of claim 9, wherein the UCI is transmitted on the particular sub-slot PUCCH resource.

14. The UE of claim 9, wherein the quantity of PUCCH repetitions is determined further based on one or more configuration messages that include a radio resource control (RRC) message.

15. The UE of claim 9, wherein the particular sub-slot PUCCH resource is used for transmitting the UCI further based on a radio resource control (RRC) configuration.

16. The UE of claim 9, wherein, when transmitting the UCI in the plurality of sub-slot PUCCH resources, the one or more processors are configured to:
transmit the UCI in the particular sub-slot PUCCH resource.

17. A non-transitory computer-readable medium storing a set of instructions for wireless communication, the set of instructions comprising:
one or more instructions that, when executed by one or more processors of a user equipment (UE), cause the UE to:
receive a downlink control information (DCI) message, the DCI message identifying a particular sub-slot physical uplink control channel (PUCCH) resource of a plurality of sub-slot PUCCH resources at which to start transmission;
determine, based at least in part on the DCI message, a quantity of PUCCH repetitions to transmit; and
transmit uplink control information (UCI) in the quantity of PUCCH repetitions, wherein each PUCCH repetition in the quantity of PUCCH repetitions is transmitted in a same PUCCH resource in each of a set of consecutive sub-slots, and wherein each PUCCH repetition in the quantity of PUCCH repetitions does not cross a slot boundary.

18. The non-transitory computer-readable medium of claim 17, wherein the particular sub-slot PUCCH resource is a sequentially first sub-slot PUCCH resource of the plurality of sub-slot PUCCH resources.

19. The non-transitory computer-readable medium of claim 17, wherein the UCI includes hybrid automatic repeat request (HARQ) acknowledgement (ACK) feedback.

20. The non-transitory computer-readable medium of claim 17, wherein the quantity of PUCCH repetitions is determined based on the DCI message identifying the particular sub-slot PUCCH resource.

21. The non-transitory computer-readable medium of claim 17,
wherein the UCI is transmitted on the particular sub-slot PUCCH resource.

22. The non-transitory computer-readable medium of claim 17, wherein the particular sub-slot PUCCH resource is used for transmitting the UCI further based on a radio resource control (RRC) configuration.

23. An apparatus for wireless communication, comprising:
means for receiving a downlink control information (DCI) message,
the DCI message identifying a particular sub-slot physical uplink control channel (PUCCH) resource of a plurality of sub-slot PUCCH resources at which to start transmission;
means for determining, based at least in part on the DCI message, a quantity of PUCCH repetitions to transmit; and
means for transmitting uplink control information (UCI) in the quantity of PUCCH repetitions, wherein each PUCCH repetition in the quantity of PUCCH repetitions is transmitted in a same PUCCH resource in each of a set of consecutive sub-slots, and wherein each PUCCH repetition in the quantity of PUCCH repetitions does not cross a slot boundary.

24. The apparatus of claim 23, wherein the quantity of PUCCH repetitions is determined based on the DCI message identifying the particular sub-slot PUCCH resource.

25. The apparatus of claim 23, wherein the UCI is transmitted on the particular sub-slot PUCCH resource.

26. The apparatus of claim 23, wherein the particular sub-slot PUCCH resource is used for transmitting the UCI further based on a radio resource control (RRC) configuration.

* * * * *